United States Patent

[11] 3,615,836

[72] Inventor John S. Batzold
 Westfield, N.J.
[21] Appl. No. 642,722
[22] Filed June 1, 1967
[45] Patented Oct. 26, 1971
[73] Assignee Esso Research and Engineering
 Continuation-in-part of application Ser. No. 394,622, Sept. 4, 1964, now abandoned.

[54] FUEL CELL CONTAINING AND A PROCESS OF MAKING AN ACTIVATED FUEL CELL CATALYST
 10 Claims, No Drawings
[52] U.S. Cl................................................... 136/86 D,
 136/120 FC
[51] Int. Cl........................................................ H01m 27/10,
 H01m 13/04
[50] Field of Search.............................................. 136/86,
 120, 120 FC; 75/108; 252/472

[56] References Cited
UNITED STATES PATENTS

| | | | |
|---|---|---|---|
| 3,348,975 | 10/1967 | Ziering | 136/120 |
| 2,893,948 | 7/1959 | Hettinger, Jr. | 252/472 X |
| 3,215,563 | 11/1965 | Clemm | 136/120 X |
| 3,281,282 | 10/1966 | Barber | 136/86 X |
| 3,309,231 | 3/1967 | Hess | 136/120 X |
| 3,340,097 | 9/1967 | Hess et al. | 136/86 X |
| 3,431,220 | 3/1969 | Batzold | 252/472 |

Primary Examiner—Winston A. Douglas
Assistant Examiner—M. J. Andrews
Attorneys—Pearlman and Stahl and Robert I. Pearlman ABSTRACT: A catalyst selected from the group consisting of noble metals, transition metals, lanthanide series metals, mixtures and alloys thereof, which have limited activity because of absorbed halide ions, may be employed in electrodes of a fuel cell containing a halide ion free acid electrolyte provided that, prior to its operation in the fuel cell, the catalyst has been treated with a basic solution having a pH in the range of 8 to 14 for a period of time sufficient to desorb the halide ions.

FUEL CELL CONTAINING AND A PROCESS OF MAKING AN ACTIVATED FUEL CELL CATALYST

CROSS-REFERENCE TO RELATED APPLICATIONS

This application is a continuation-in-part application of U.S. Ser. No. 394,622, filed Sept. 4, 1964, now abandoned.

BACKGROUND TO THE INVENTION

1. Field of the Invention

This invention pertains to fuel cells employing acid electrolytes and to the method of producing catalysts which may be employed in the electrodes of such fuel cells. In particular, this invention pertains to a fuel cell containing an acid electrolyte, the catalyst of the electrode of which has been produced by a process of reducing the halide salt of the catalyst and wetting the reduced catalyst with a basic solution.

2. Description of the Prior Art

Heretofore in the art, metal catalysts used in fuel cells have been produced by a process which consists of reducing the halide salt of the desired catalyst to the catalyst metal or to a lower valence state metal salt. The catalysts produced by such a method have been successfully in electrodes of fuel cells containing basic electrolytes. It has been found, however, that catalysts produced by this procedure cannot successfully perform in fuel cells containing acid electrolytes. It is theorized that upon the reduction of the catalytic halide salt to the metal or lower valance state metal ion, the halide ion of the salt becomes absorbed in the reduced catalyst. This halide ion, if not removed, poisons the activity of the catalyst when such catalyst is used in an electrode of a fuel cell employing an acid electrolyte. Previously, this problem did not arise in fuel cells employing basic electrolytes as the basic electrolyte inherently desorbed the halide ion and activated the catalyst. This inherent activation, however, does not occur in fuel cells employing acid electrolytes.

SUMMARY OF THE INVENTION

It has now been found that a catalytic electrode, the catalyst of which is produced by a method which comprises reducing the halide salt of a catalyst selected from the group consisting of noble metals, transition metals, lanthanide series metals, and mixtures thereof, the reduced catalyst having absorbed therein halide ions; and wetting and reduced catalyst with a basic solution having a pH in the range of 8 to 14 for a period of time sufficient to desorb the halide ion, may be successfully employed in a fuel cell containing an acid electrolyte. A catalyst produced by this process is activated by the base desorption of halide ions prior to its use in a fuel cell containing an acid electrolyte.

The method of reducing the catalytic halide salts may be by any of the known processes such as chemical reduction from solution by treating a solution of the halide salt or salts with a reducing agent such as potassium borohydride, sodium borohydride, formic acid, diborane, formaldehyde or the radical ion procedure as set forth in U.S. Pat. No. 2,177,412. The reduced catalyst may also be produced by reduction of the halide salts in a hydrogen atmosphere or in a carbon monoxide atmosphere at intermediate temperatures of 350° to 1,000° F.

The finely divided catalyst particles produced from the reduction step are activated by treating this material with a basic reagent having a pH of from 8 to 14 for a period of time sufficient to desorb the halide ions. The treating step consists of immersing, spraying or otherwise wetting the catalytic material. The catalytic material may be activated by base either before or after it is incorporated into an electrode structure. The period of time sufficient to desorb the halide ions can vary from about 30 seconds up to a few hours, however, times of greater than about 20 minutes are unnecessary. The preferred time is from about 0.5 to 20 minutes and, most preferably, about 1 to 10 minutes. The pH of the solution can be from 8 to 14, the most preferably pH range being 10 to 14.

The fuel cells, the catalysts of the electrodes of which are produced by the above process, are of the type generally known to the art. Such fuel cells contain an anode and a cathode with a fuel and oxidant feed and an electrolyte. Preferably, however, the catalysts activated by base treatment will be used in fuel cells employing anodically oxidized, liquid, carbonaceous fuel. Most preferably, the fuel is methanol.

The electrolytes used in the fuel cell include mineral acids with exception of the halide acids, i.e., HF, HCl, HBr, and HI. Examples of these electrolytes include, but are not limited to, sulfuric acid, phosphoric acid, etc.

The compounds from which the activated catalyst may be prepared include the halide salts, e.g., the fluoride, chloride, bromide, and iodide salts, of the noble metals, transition metals, lanthanide series metals, and mixtures thereof. In addition, other compounds containing halides, such as oxychlorides, oxybromides, hydroxyhalide acids and amine halide complexes can be used. The metals of the metal salt include platinum, ruthenium, rhodium, palladium iridium, osmium, rhenium, manganese, chromium, vanadium, titanium, aluminum, magnesium, molybdenum, tungsten, gold, silver, lead, and the lanthanide series metals such as cesium, neodymium, samarium, gadolinium, promethium, ytterbium, erbium or combinations of the foregoing noble metals, transition metals and lanthanide series metals. Examples of mixed metal catalysts produced by the process of this invention include: platinum-iridium, platinum-rhodium, platinum-iron-iridium, iron-cobalt, platinum-chromium, platinum-rhenium-vanadium, platinum-gold, gold-iridium and silver-iron. The reduction of the catalytic halide salts will also produce finely divided metal catalysts which are not in the zero valence state but are in a lower oxidation state than they were in as the metal ion of the salt. It is also to be noted that in some cases a mixture of the reduced metals exhibit characteristics of the alloys of the two metals so reduced. Such alloys are also activated by the base treatment step. In addition to desorbing the halide ions, the base treatment also removes any grease, dirt, or other contaminants which reduce the activity of the catalyst.

The catalyst produced from the reduction process include, in addition to metals which have been reduced from halide salts, metals which have been reduced from compounds other than the halide salt such as, for example, from oxides. Thus, a combination of chloroplatinic acid and rhenium oxide can be reduced such that the final product consists of a combination of platinum and a rhenium oxide in a lower valence state than that which it was in prior to reduction. Such a catalyst mixture would, however, have absorbed in it a chloride ion which must be removed before this catalyst could be used in a fuel cell employed in an acid electrolyte. It follows that the process of activating the catalysts maybe used in situations where the catalyst consists of a mixture of more than one catalytic metal and only one catalyst of such a mixture is reduced from its halide salt.

The basic solutions which can be used to treat the finely divided catalyst particles, in order to increase their efficiency as catalysts, include, but are not limited to, alkali metal hydroxides such as sodium hydroxide, potassium hydroxide and lithium hydroxide and alkali metal metasilicates such as sodium metasilicate, lime, trisodium phosphate, sodium carbonate and aqueous solutions thereof. Normal ammonia can also be used. The procedure of activating the reduced catalysts is preferably conducted at room temperatures. However, temperatures between the freezing and boiling point of the solution can be used.

DESCRIPTION OF THE PREFERRED EMBODIMENT

The following examples are submitted for the purpose of illustration only and are not to be construed as a limitation upon the scope of the invention as set forth in the appended claims.

Example 1

A platinum-ruthenium catalyst was prepared by treating a solution of 740 mg. chloroplatinic acid and 260 mg. RuCl$_3$ in 30cc. H$_2$O with 3 g. sodiumborohydride dissolved in 50 cc. H$_2$O. The resulting finely divided material was divided into two portions. One portion was treated by immersion in 3.7 M sulfuric acid for about 15 minutes and the second portion was treated by immersion in 6 M potassium hydroxide for approximately the same length of time. The two portions were removed from their treating solution and incorporated onto a platinum screen to form an electrode. The catalyst was then tested for the anodic oxidation of methanol in a fuel cell having an acid electrolyte of 30percent H$_2$SO$_4$. The acid treated catalyst was then immersed in 6 M KOH and retested. The results of all three tests are set forth in table I.

Methanol polarization in volts or volts polarized refers to the difference between the theoretical potential of an electrochemical reaction and the actual potential at which the reaction occurs at some level of current. Thus, more efficient catalysts reduce the difference and result in smaller values of polarization. The catalytic activity is best expressed by current which is a direct measure of the rate of the electrochemical reaction. A logarithmic relationship exist between current

Example 2

A platinum-ruthenium-rhenium catalyst was prepared by treating a solution of 3.91 g. H$_2$PtCl$_6$, 1.62 g. RuCl$_3$, and 0.384 g. Re$_2$O$_7$ in 75 ml. H$_2$O with 15 gm. of potassium borohydride in 250 cc. H$_2$O at room temperature. The resulting catalyst, which is referred to in table II as catalyst A, was comprised of 54 atom % Pt, 36 atom % Ru, and 10 atom % Re, based on the total of each of the metal constituents. A platinum-ruthenium catalyst waS also prepared by reducing 3.7 g. H$_2$PtCl$_6$ and 1.3 g. RuCl$_3$ in 75 ml. H$_2$O with 15 g. of sodium borohydride in 250 cc, H$_2$O at room temperature. This catalyst, which is designated as catalyst B in table II, was comprised of 60 atom % Pt and 40 atom % Ru, based on the total of each of the metal constituents. Both catalysts were made into an electrode structure by incorporating the metal onto a platinum screen. Each of these catalysts was treated with basic solutions of KOH, KH$_2$PO$_4$, K$_2$HPO$_4$ and K$_3$PO$_4$ having different pH values. The results of this activation in terms of fuel cell catalyst activity was compared with the activity of a catalyst which had not been base treated. The fuel cell used to evaluate catalyst performance was operated at 60° C. with a fuel of 1 M methanol and with an electrolyte of 3.7 M sulfuric acid. The results of this evaluation appear in table II.

TABLE II

| Treating solution | Approx. pH | Catalyst A [1] treating time: 5 mins. | | Catalyst A [1] treating time: 30 mins. | | Catalyst B [2] treating time: 10 mins. | |
|---|---|---|---|---|---|---|---|
| | | *Polarization, volts | Relative cat. activity | *Polarization, volts | Relative cat. activity | *Polarization, volts | Relative cat. activity |
| None | | 0.54 | 1 | 0.54 | 1 | 0.37 | 1 |
| 1 M KH$_2$PO$_4$ | 4 | 0.52 | 1.8 | 0.47 | 7 | 0.36 | 1.6 |
| 1 M K$_2$HPO$_4$ | 10 | 0.42 | 33 | 0.39 | 88 | 0.34 | 4 |
| 1 M K$_3$PO$_4$ | 13 | 0.36 | 220 | 0.37 | 160 | 0.33 | 8 |
| 6 M KOH | 14 | 0.36 | 220 | | | 0.33 | 8 |

[1] Catalyst A: 54 atom % Pt; 36 atom % Ru; 10 atom % Re.
[2] Catalyst B: 60 atom % Pt; 40 atom % Ru.
*Polarization from methanol theory at 2.5 ma./mg. in volts.

TABLE I

1 M Methanol 140° F. 30% H$_2$SO$_4$

Methanol Polarization in volts at Indicated Current per mg. of Catalyst

| Treatment | 0.05 | 0.5 | 2.5 | 5 |
|---|---|---|---|---|
| 3.7 M H$_2$SO$_4$ | 0.27 | 0.34 | 0.42 | — |
| 6 M KOH | 0.18 | 0.25 | 0.30 | 0.33 |
| 3.7 M H$_2$SO$_4$–6 M KOH | 0.21 | 0.27 | 0.34 | 0.37 | level per mg. of catalyst and polarization with the result that a very slight decrease in polarization results in a great increase of catalyst activity. In table I, catalyst activity was evaluated in terms of the polarization required to maintain a given level of current per milligram of catalyst. The total amount of catalyst used in each electrode was recorded so as to ensure comparisons based on the same amount of catalyst. It is to be noted, from a study of table I, that the acid treated electrode failed before sustaining a current of 5 ma. per mg. of catalyst. However, upon treatment with the basic solution, the acid treated catalyst was able to sustain that current with very little polarization.

It caN be seen from the above table that the activity of a catalyst in a fuel cell using an acid electrolyte is directly proportional to the pH of the treating solution. The catalyst which received no treatment was assigned an arbitrary relative catalyst activity of 1. On this basis it can be seen that as the pH of the treating solution increases, the relative catalyst activity increases dramatically. Thus, it is quite advantageous to treat a halide ion absorbed catalyst with a base prior to its use in an acid electrolyte fuel cell.

Example 3

An iridium-ruthenium catalyst was prepared by reducing a solution of 4.29 g. IrBr$_3$ and 2.16 g. RuCl$_3$ in 50cc. H$_2$O with a solution of 15 gm. NaBH$_4$ in 200 cc. H$_2$O. The resulting precipitate was washed with water and divided into two portions. The first portion was incorporated into a platinum screen and tested as the catalyst in the anodic oxidation of methanol in a fuel cell employing an acid electrolyte of 30% H$_2$SO$_4$. The catalyst was polarized 0.74 volts at 2.5 ma./mg. A second portion was immersed in 6 M KOH for 10 minutes then incorporated onto a platinum screen and then tested as the first portion. The KOH treated portion was polarized 0.34 volts at 2.5 ma./mg.

Example 4

A platinum-ruthenium-rhenium catalyst was prepared by reducing 4.15 g. H$_2$PtCl$_6$, 1.44 gm. RuCl$_3$ and 0.337 g. Re$_2$O$_7$ in 50 cc. H$_2$O with 3 g. KBH$_4$ in 200 cc. H$_2$O. The resulting catalyst, which is referred to in table III as catalyst C was comprised of 54 atom % Pt, 36 atom % Ru, and 10 atom % Re, based on the total of each of the metal constituents. This catalyst was incorporated onto a platinum screen to form an electrode which was employed in a fuel cell operating at 60° C. with a fuel of 1 M methanol and an electrolyte of 3.7 M sulfuric acid. The electrode was tested initially with no base treatment. The polarization of this electrode was evaluated and assigned an arbitrary relative catalyst activity of 1. This same electrode was then treated with an aqueous solution of KOH with a very dramatic increase in relative catalyst activity. The electrode was then treated with hydrochloric acid and evaluated again in the cell. The relative catalyst activity decreased markedly. This same electrode was then successively activated and deactivated, the results of such treatment on the catalyst activity shown in table III.

TABLE III

| | | Catalyst C [1] | |
|---|---|---|---|
| Treating Solution | Treating Time | *Polarization volts | Relative Cat. Activity |
| None | — | 0.52 | 1 |
| 6 M KOH | 15 mins. | 0.36 | 110 |
| 1 M HCl | 2 mins. | 0.46 | 5.4 |
| 6 M KOH | 5 mins. | 0.36 | 110 |
| 1 M HCl | 5 mins. | 0.50 | 2.0 |
| 1 M K$_3$PO$_4$ | 10 mins. | 0.36 | 110 |

[1] Catalyst C: 54 atom % Pt, 36 atom % Ru, 10 atom % Re.
*Polarization from methanol theory at 2.5 ma./mg. in volts.

This table shows that the halide ion causes the poisoning of the catalyst and that such poisoning may be obviated by treatment with a base.

What is claimed is:

1. A method of preparing a finely divided halide-free fuel cell catalyst and incorporating an electrode containing same into a fuel cell which comprises:
   a. chemically reducing at least one noble catalyst metal halide salt to the corresponding metal or lower metal oxide in finely divided form, the reduced catalyst having absorbed therein halide ions;
   b. treating the resulting finely divided reduced catalyst with a basic solution having a pH of at least 8 for a period of time sufficient to desorb the halide ion and to activate said catalyst;
   c. forming said halide-free catalyst into an electrode;
   d. incorporating said electrode into a fuel cell containing a halide-ion-free mineral acid electrolyte; and
   e. using said fuel cell to generate electricity.

2. A method as in claim 1 in which said noble metal is selected from the group consisting of platinum, ruthenium, iridium and rhenium.

3. A method as in claim 1 wherein the basic solution has a pH in the range of 10 to 14.

4. A method as in claim 3 wherein the basic solution is a solution of an alkali metal hydroxide.

A fuel cell containing an anode, a cathode, and a halide-ion-free mineral acid electrolyte, at least one of said anode or cathode being a halide-free catalytic electrode comprising a support and a finely divided catalyst produced by a method which comprises:
   a. chemically reducing at least one noble catalyst metal halide salt to the corresponding metal or lower metal oxide in finely divided form, the reduced catalyst having absorbed therein halide ions; and
   b. treating the resulting finely divided reduced catalyst with a basic solution having a pH of at least 8 for a period of time sufficient to desorb the halide ion and to activate said catalyst.

6. A fuel cell as in claim 5 wherein the acid electrolyte is selected from the group consisting of sulfuric acid and phosphoric acid.

7. A fuel cell as in claim 6 wherein the basic solution has a pH in the range of 10 to 14.

8. A fuel cell as in claim 7 wherein the basic solution is a solution of an alkali metal hydroxide.

9. A method of preparing a finely divided halide-free fuel cell catalyst and incorporating an electrode containing same into a fuel cell which comprises:
   a. chemically reducing at least one noble catalyst metal halide salt to the corresponding metal or lower metal oxide in finely divided form, the reduced catalyst having absorbed thereon halide ions;
   b. forming said catalyst into an electrode;
   c. treating the electrode containing said finely divided reduced catalyst with a basic solution having a pH of at least 8 for a period of time sufficient to desorb the halide ion and to activate said catalyst:
   d. incorporating said electrode into the fuel cell containing a halide ion free mineral acid electrolyte; and
   e. using said fuel cell to generate electricity.

10. A method according to claim 9 in which said electrode is formed by incorporating said catalyst into a conductive metal screen.

Disclaimer 3,615,836.—*John S. Batzold*, Westfield, N.J. FUEL CELL CONTAINING AND A PROCESS OF MAKING AN ACTIVATED FUEL CELL CATALYST. Patent dated Oct. 26, 1971. Disclaimer filed Aug. 12, 1970, by the assignee, *Esso Research and Engineering Company*.

Hereby disclaims the portion of the term of the patent subsequent to Mar. 4, 1986.

[*Official Gazette March 21, 1972.*]